United States Patent
Nakayama et al.

(10) Patent No.: US 6,892,432 B2
(45) Date of Patent: May 17, 2005

(54) NANOTUBE CARTRIDGE AND A METHOD FOR MANUFACTURING THE SAME

(75) Inventors: Yoshikazu Nakayama, 9-404, 14-2, Kongaoka 1-chome, Hirakata-city, Osaka 573-0084 (JP); Seiji Akita, Izumi (JP); Takayoshi Kishida, Miyazaki (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 558 days.

(21) Appl. No.: 10/011,053

(22) Filed: Dec. 7, 2001

(65) Prior Publication Data

US 2002/0069505 A1 Jun. 13, 2002

(30) Foreign Application Priority Data

Dec. 7, 2000 (JP) ........................................ 2000-404005

(51) Int. Cl.$^7$ ............................................... B23P 17/00
(52) U.S. Cl. ............................. 29/412; 29/830; 29/832; 977/DIG. 1; 438/694; 438/486
(58) Field of Search ................................. 29/830, 832.8, 29/46, 412; 977/DIG. 1; 438/694, 691, 1, 105, 142, 607, 486; 73/1.89, 105

(56) References Cited

U.S. PATENT DOCUMENTS 6,283,812 B1 * 9/2001 Jin et al. ........................ 445/24
6,322,713 B1 * 11/2001 Choi et al. ..................... 216/38
6,800,865 B2 * 10/2004 Nakayama et al. ...... 250/492.3

* cited by examiner

Primary Examiner—Richard Chang
(74) Attorney, Agent, or Firm—Koda & Androlia

(57) ABSTRACT

A method for manufacturing a nanotube cartridge including the steps of: adhering numerous nanotubes to a surface of a holder, disposing a knife edge at an inclination to the surface of the holder so that the knife edge is raised with its tip end being in contact with the surface of the holder, and collecting the nanotubes to near the tip end of the knife edge by moving the knife edge in a direction opposite from the tip end with the tip end being kept in contact with the surface, thus allowing the nanotubes to be arranged on the tip end of the knife edge with the nanotubes protruding from the tip end. When adhering the nanotubes to the holder surface, nanotubes are merely put in a vessel, the holder is placed in the vessel, and then the vessel is vibrated.

6 Claims, 10 Drawing Sheets

NANOTUBE CARTRIDGE AND A METHOD FOR MANUFACTURING THE SAME

BACKGROUND OF THE INVENTION

1. Field of the Invention

The present invention relates to a nanotube cartridge that has nanotubes protruding from a tip edge thereof and further to a method for manufacturing such a nanotube cartridge.

2. Prior Art

In recent years, scanning probe microscopes (SPM) such as tunnel microscopes (STM), atomic force microscopes (AFM), etc. have been developed. These devices detect information concerning the physical properties of sample surfaces at the atomic level. When obtaining information concerning the physical properties of sample surfaces using scanning probe microscopes, a probe needle that detects information by directly contacting the sample surface is required.

Such probe needles are currently constructed from a semiconductor cantilever. In this semiconductor cantilever, a protruding portion is formed on a cantilever portion, and the tip end of this protruding portion is worked to a sharp point. The sharpened tip end of the protruding portion forms a probe needle point. Information on physical properties such as information concerning atomic structure, magnetic information, information concerning functional groups, information concerning electrons, etc. are obtained by causing this tip end to contact the sample surface so that physical and chemical interactions with the sample surface are detected.

The resolution of information concerning physical properties naturally increases when the probe needle point has an increased sharpness. However, even if the tip end of the protruding portion is sharpened using semiconductor techniques, it is difficult at the current technical level to reduce the diameter of the tip end to a value that is less than several tens of nanometers. Under these circumstances, carbon nanotubes were discovered, and a carbon nanotube probe needle in which a carbon nanotube is adhered to the protruding portion was proposed by H. Dai et al. in *NATURE* (Vol. 384, Nov. 14, 1996).

The diameters (D) of carbon nanotubes range from approximately one nanometer to several tens of nanometers, and such carbon nanotubes have an axial length (L) of up to several microns. The aspect ratio (L/D) of such carbon nanotubes ranges from several hundred to several thousand, and these carbon nanotubes have optimal properties for use as probe needles in scanning probe microscopes. However, in conventional carbon nanotube probe needles, carbon nanotubes are simply caused to adhere to the protruding portion. As a result, such probe needles have drawbacks in that a few scans of the sample surface with the carbon nanotube causes the carbon nanotube to fall off of the protruding portion, and the probe needle effect is lost.

Accordingly, the inventors of the present application invented two methods for firmly fixing a carbon nanotube to the protruding portion of cantilever portion. In one method, the carbon nanotube is covered and fastened to the surface of the protruding portion by a coating film. This method is disclosed in Japanese Patent Application Laid-Open (Kokai) No. 2000-227435. In another method, the base end portion of the carbon nanotube is fused to the surface of the protruding portion by subjecting this base end portion to electron beam irradiation or by passing an electric current through this base end portion. This method is disclosed in Japanese Patent Application Laid-Open (Kokai) No. 2000-249712.

In these Japanese Laid-Opened applications, the inventions are not limited to carbon nanotubes. The inventions are applicable to nanotube probe needles that use nanotubes in general, such as BN type nanotubes (boron nitride), BCN type nanotubes (boron carbonitride), etc.

In the above Japanese Laid-Opened (Kokai) applications, a nanotube cartridge in which carbon nanotubes are lined so as to protrude on a knife edge is used when the carbon nanotube probe needle is manufactured.

Conventional nanotube cartridge manufacturing methods will be described below.

First, carbon nanotubes (CNT) are purified by electrophoretic method disclosed in Japanese Patent Application Laid-Open (Kokai) No. 2000-72422. CNTs are purified by dispersing a carbon mixture in an electrophoretic solution, and applying a direct-current voltage or alternating-current voltage. When a direct-current voltage is applied, the CNTs are lined up in a straight row on the cathode. When an alternating-current voltage is applied, CNTs are lined up in straight rows on both the cathode and anode as a result of the formation of a non-uniform electric field. This electrophoretic method is usable so as to purify not only carbon nanotubes but also BCN type nanotubes and BN type nanotubes. In the description below, these nanotubes, including carbon nanotubes, will be collectively referred to "nanotubes".

Next, a process in which the purified nanotubes are dispersed in dispersion solution and then caused to adhere to a knife edge by electrophoresis will be described.

FIG. 11 shows the manner of manufacturing a nanotube cartridge that uses direct-current electrophoresis.

An electrophoretic solution 20 that contains dispersed nanotubes is placed inside a hole in a glass substrate 21. Knife edges 22 and 23 are disposed so as to face each other in this solution, and a direct-current power supply 18 is applied. The knife edges 22 and 23 have sharp blade tips 22a and 23a at their tip ends. Countless, extremely small nanotubes that are invisible to the naked eye are present in the electrophoretic solution 20. The nanotubes are charged as a result of contact with the electrophoretic solution and are caused to move by the electric field. When the electrophoretic solution is isopropyl alcohol, the nanotubes are caused to adhere to the blade tip 22a of the knife edge 22 of the cathode in a perpendicular state. This arrangement of the nanotubes can be confirmed by an electron microscope.

FIG. 12 shows the manner of manufacturing a nanotube cartridge that uses alternating-current electrophoresis.

The manner of nanotube cartridge manufacturing in FIG. 12 is similar to that shown in FIG. 11. Only difference is that an alternating-current power supply 19 is applied via an amplifier 26. A non-uniform electric field acts between the two cathodes. In long slender objects such as nanotubes, the polarized charge induced in the nanotubes senses the non-uniform electric field so that the nanotubes undergo electrophoresis. In this case, amorphous particles are immovable. Accordingly, unlike the direct-current method, the alternating-current method has a particle discriminating function. Even if a non-uniform electric field is not deliberately constructed, local non-uniform electric fields are formed in actuality. Thus, electrophoresis can be realized. In the alternating-current method, an alternating current of, for instance, 5 MHz, 90 V is applied. Nanotubes adhere perpendicularly to the blade tips 22a and 23a of the knife edges of both electrodes.

FIG. 13 shows a completed nanotube cartridge.

The nanotube cartridge A is comprised of the knife edge 23 and nanotubes 4 that adhere to the blade tip 23a of this knife edge 23 in a substantially perpendicular fashion relative to the knife edge 23. The nanotubes 4 are perpendicular to the blade tip 23a, and some of them are at an oblique angle. In some cases, furthermore, nanotubes 4 are gathered together and adhered in bundles.

FIG. 14 shows a manner that transfers nanotubes to an AFM cantilever.

A cantilever 27 is a silicon element that comprises a cantilever portion 28 and a protruding portion 29 that is formed at the tip end of the cantilever portion 28. A nanotube cartridge A is disposed so that the nanotubes 4 face the protruding portion 29. The cantilever is movable and adjustable three-dimensionally (XYZ), and the nanotube cartridge A is movable two-dimensionally (XY). By way of these movements and adjustments, a nanotube 4 is transferred to protruding portion 29 so that the tip ends 4c of the nanotube adheres to the protruding portion 29. These operations are performed while being magnified and projected in an electron microscope compartment 30.

FIG. 15 shows a completed nanotube probe needle B.

The base end portion 4b of the nanotube 4 is fastened to the protruding portion 29 by a coating film and/or fusion. The above-described tip end region 4c now becomes the base end portion 4b. The tip end portion 4a of the nanotube 4 acts as a probe needle. The tip end portion 4a contacts with a sample surface, so that information on the physical properties of the sample is detected by, for instance, an AFM operation.

It has been found that, by using of such a nanotube probe needle as completed as described above, a high-resolution image of the sample surface can be detected as a result of the superior aspect ratio of the nanotube. Furthermore, as a result progress made in recent research, numerous shining results have been obtained in various fields such as physics, chemistry and biochemistry, etc.

While such a nanotube probe needle B has superior properties, a nanotube cartridge A must be used to manufacture this nanotube probe needle B. However, since this nanotube cartridge A is manufactured by the electrophoretic method, not only is a high degree of technology required, but complicated processes using numerous parts are required. Thus, the manufacturing cost is high, creating a factor that hinders the popularization of such nanotube probe needles B.

SUMMARY OF THE INVENTION

Accordingly, the object of the present invention is to provide a nanotube cartridge free of the problems seen in the prior art nanotube cartridges and to provide a method that manufactures a nanotube cartridge inexpensively by a simple operation without using electrophoresis.

The above object is accomplished by unique steps of the present invention for a method for manufacturing a nanotube cartridge, and the manufacturing method of the present invention comprises the steps of: adhering numerous nanotubes to a surface of a holder; disposing a knife edge at an inclination to the surface of the holder so that a main body of the knife edge is caused to float or to be raised with a blade tip of the knife edge being in contact with the holder surface; and collecting the nanotubes, which are on the surface of the holder, to a blade tip of the knife edge by way of moving the knife edge in a direction opposite from the blade tip with the blade tip being kept in contact with the surface, thus allowing the nanotubes to be arranged on the blade tip of the knife edge so that the nanotubes protrude from the blade tip.

In the above method, the holder can be another knife edge that has also a blade tip, and the surface of another knife edge is adhered with numerous nanotubes.

Also, a semiconductor wafer or a semiconductor chip cut from the semiconductor wafer can be used as the holder, and the surface of the semiconductor wafer or the semiconductor chip is adhered with numerous nanotubes.

It is further possible in the present invention that nanotubes are caused to adhere to the surface of the knife edge either, and the knife edge having the nanotubes thereon is disposed at an inclination so that the surface of the knife edge having the nanotubes thereon faces the surface of the holder.

In the present invention, a voltage can be applied across the holder and the knife edge, thus causing the nanotubes to adhere more readily to the blade tip of the knife edge.

Furthermore, in the method of the present invention, when adhering the nanotubes to the holder and/or knife edge, the nanotubes are put in a vessel, the holder is put in the vessel, and the vessel as a whole is vibrated so that the nanotubes are caused to adhere to the surface of the holder and/or the knife edge.

The above object is further accomplished by a unique nanotube cartridge according to the present invention wherein the nanotube cartridge is obtained by causing numerous nanotubes to adhere to the surface of a holder, disposing a knife edge at an inclination to the surface of the holder so that a main body of the knife edge is caused to float or to be raised with a blade tip of the knife edge being in contact with the surface, collecting the nanotubes, which are on the surface of the holder, on the blade tip side of the knife edge by way of moving the knife edge in the direction opposite from the blade tip, thus allowing the nanotubes to be arranged on the blade tip of the knife edge so that the nanotubes protrude from the blade tip

DETAILED DESCRIPTION OF THE INVENTION

Embodiments of the nanotube cartridge of the present invention and the method for manufacturing the nanotube cartridge will be described in detail below with reference to the accompanying drawings.

Figure 1:
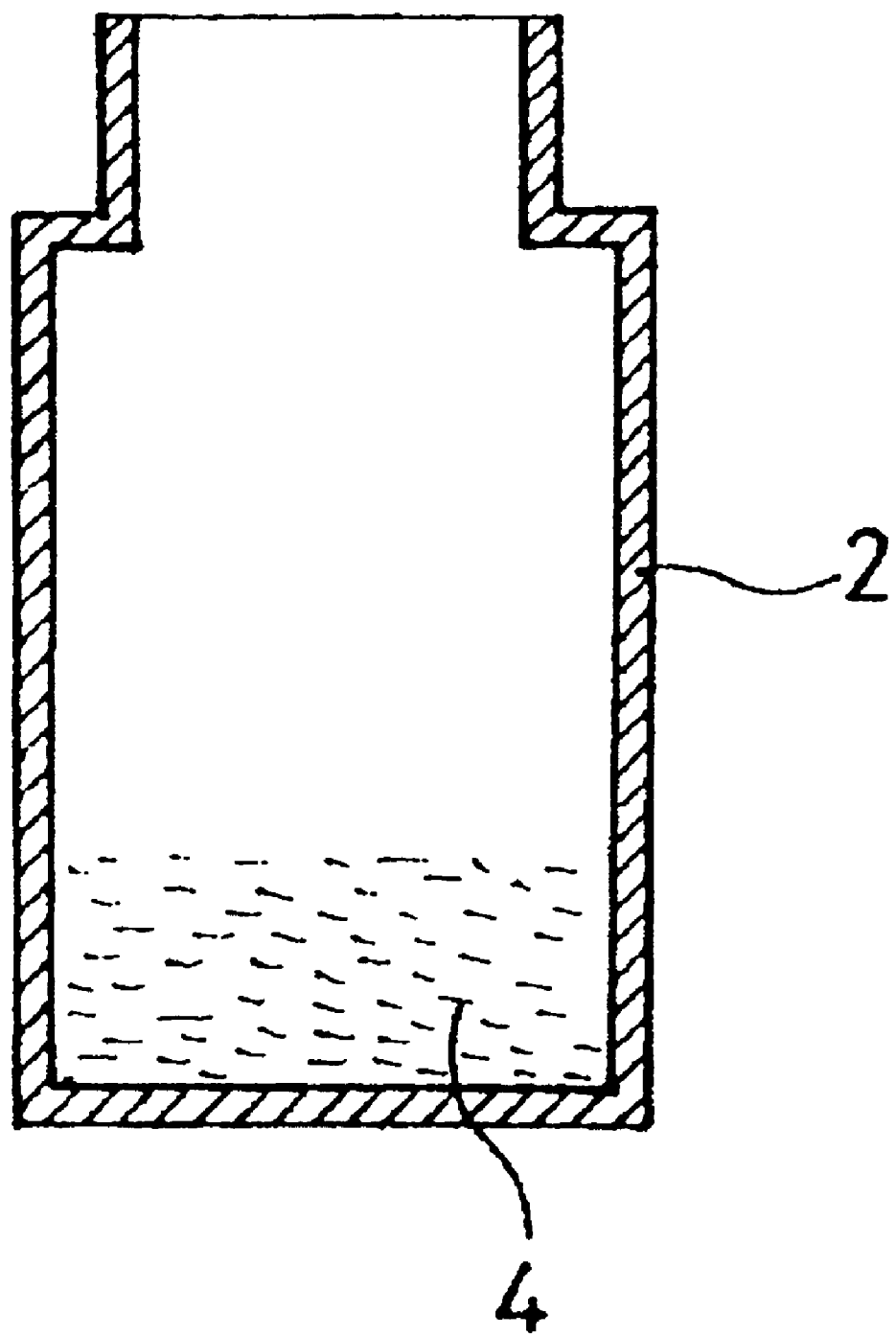
FIG. 1 is a sectional view of a vessel that accommodates nanotubes used in the present invention.

FIG. 1 shows the cross section of a vessel 2 that accommodates nanotubes. The vessel 2 can be any vessel that is capable of accommodating nanotubes 4. In the shown embodiment, a screw tube is used. The nanotubes 4 are carbon nanotubes produced by, for example, the arc discharge method. The nanotubes have a cross-sectional diameter of 1 nanometer to several tens of nanometers, and an axial length of 1 to 5 $\mu$m.

Besides the carbon nanotubes, any desired nanotubes such as BN type nanotubes, BCN type nanotubes can be used as the nanotubes 4. BN type nanotubes are produced by placing carbon nanotubes in a crucible together with powdered $B_2O_3$, and heating this mixture in $N_2$ gas, so that almost all of the C atoms are replaced by B atoms and N atoms. BCN type nanotubes are produced, for instance, by packing a graphite rod with a mixed powder of amorphous boron and graphite, and evaporating this mixture in $N_2$ gas. Such nanotubes have a structure in which some of the C atoms are replaced by B atoms and N atoms. Nanotubes produced by various other methods are all used in the present invention.

Figure 2:
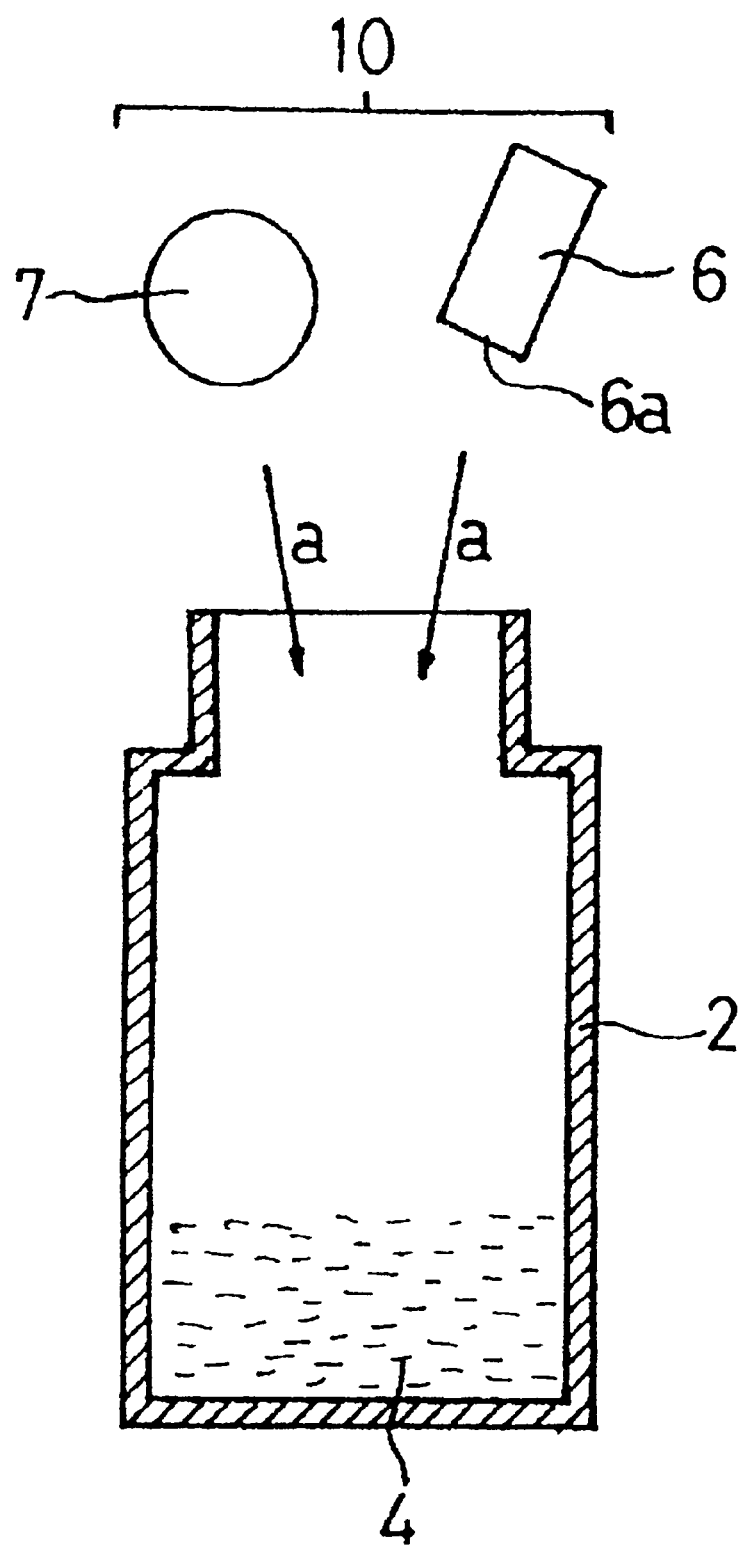
FIG. 2 is a model diagram showing holders to be placed in the vessel that accommodates nanotubes.

FIG. 2 shows the manner of putting a holder in a vessel. After the nanotubes 4 are accommodated in the vessel 2, a holder 10 to which the nanotubes are to be caused to adhere is placed in the vessel 2 in the direction indicated by arrow a. Holders can be of any configurations. In other words, any holder of various shapes to which nanotubes 4 are adhered can be used. In FIG. 2, a knife edge 6 which has a blade tip 6a and a semiconductor wafer 7 are shown as examples of the holder.

The knife edge 6 is of any substrate that has a sharp blade tip 6a. The knife edge 6 has a structure that allows nanotubes 4 to adhere to the surface of the main body thereof. For example, a razor blade and a cutter knife blade can be used. The semiconductor wafer 7 is a substrate such as a thin silicon wafer. In addition, a silicon chip such as the one obtained by way of cutting a semiconductor wafer may be utilized as the holder 10.

Figure 3:
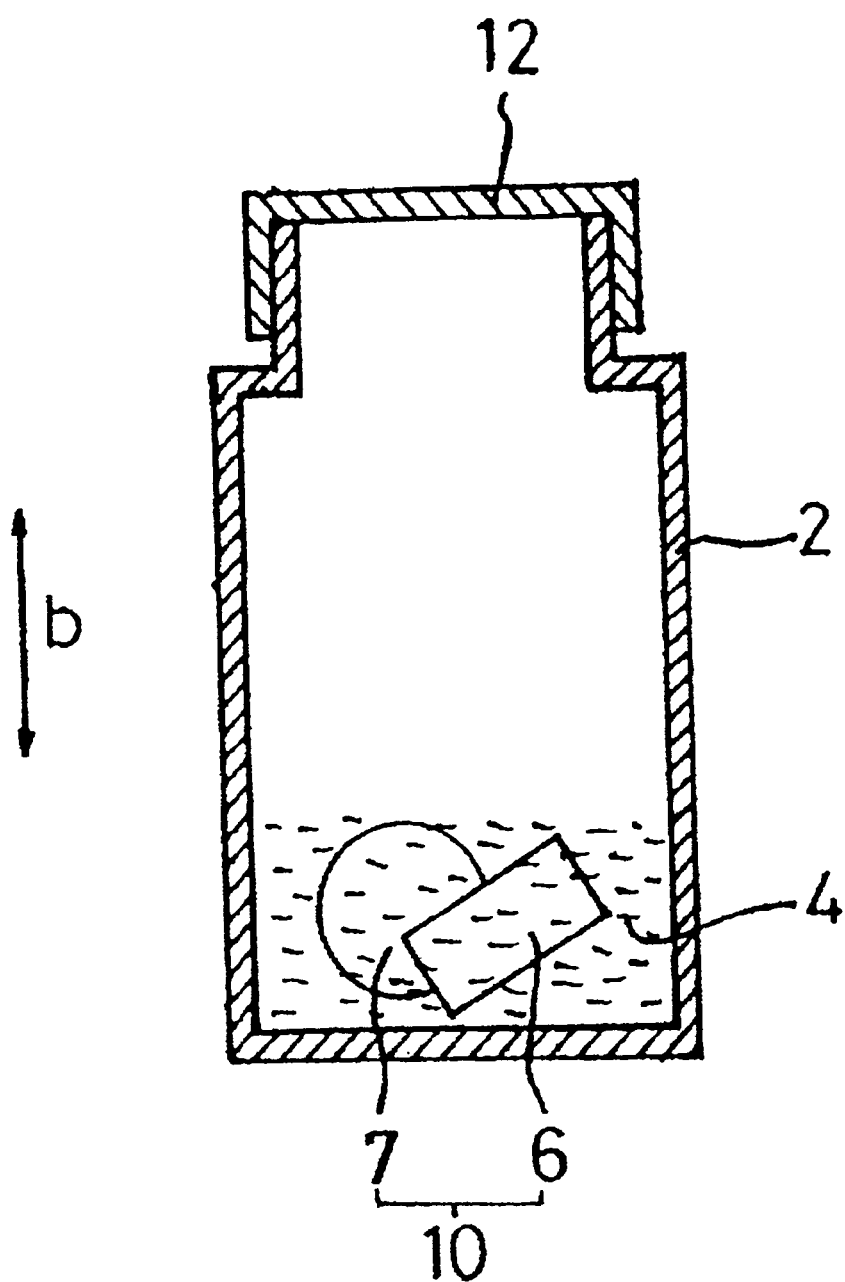
FIG. 3 is a model diagram showing the manner of vibration of the vessel as a whole after placing the holder in the vessel.

FIG. 3 shows the manner of vibration of the vessel as a whole after the holder is put in the vessel. The holder 10 is immersed in the nanotubes 4 inside the vessel 2. When the vessel 2 is vibrated back and forth in the direction shown by arrow b, the nanotubes 4 make frictional contact with the surface of the holder 10. As a result, numerous nanotubes 4 are caused to adhere to the surface of the holder 10 by electrostatic force.

Figure 4:
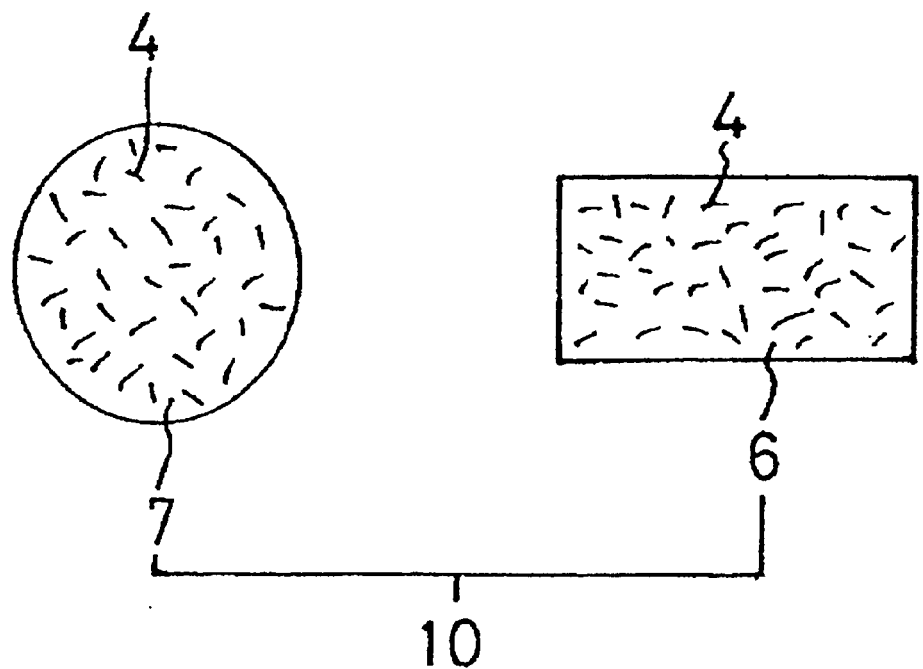
FIG. 4 is a plan view of the holders with nanotubes adhered thereon.

FIG. 4 shows the holder with the nanotubes adhered on the surfaces. Numerous nanotubes oriented in all directions adhere to the surfaces (front and rear surfaces) of the knife edge 6 and to the surfaces of the semiconductor wafer 7 that are used as the holder 10. As described above, the nanotubes 4 are merely adhered to the holder 10. Accordingly, the nanotubes 4 can easily be moved in a specified direction on the holder 10.

Figure 5:
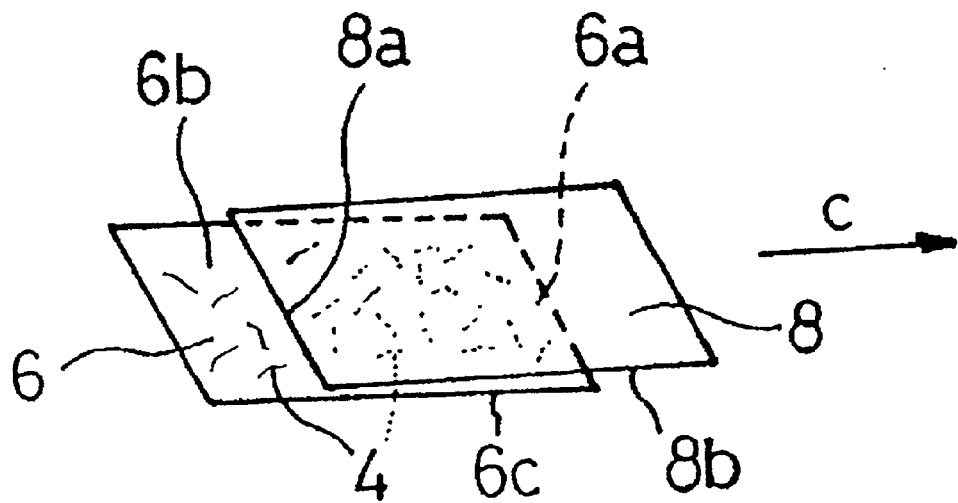
FIG. 5 is an explanatory diagram of the method of the present invention in which nanotubes adhering to a holder are collected on the blade tip of a knife edge.

FIG. 5 illustrates the method for collecting the nanotubes adhering to the knife edge 6 on the blade tip of the knife edges 6 and 8. The nanotubes 4 adhering to the upper surface 6b of the knife edge 6 are in various orientations. The blade tip 6a is oriented toward the right in FIG. 5. An unused knife edge 8 that has no nanotubes adhering thereon is superimposed on the knife edge 6 so that the blade tip 8a of the knife edge 8 faces toward the left in FIG. 5.

The blade tip 8a is brought to contact a point that is near the left-side margin of the knife edge 6. With this blade tip 8a being in contact with the knife edge 6, the knife edge 8 is disposed so that the opposite end from the blade tip 8a is caused to float upward. In other words, the right side of the knife edge 8 is raised as shown in FIG. 5. As a result, the knife edge 8 is set to obliquely intersect the knife edge 6 at a small angle of inclination. The knife edge 6 is held in this posture. Then, the knife edge 8 is moved in the direction indicated by arrow c, which is a direction opposite from the blade tip 8a, while the blade tip 8a is kept in contact with the knife edge 6. Conversely, it is possible to move the knife edge 6 in the opposite direction from arrow c. In other words, it is sufficient if the knife edge 6 and knife edge 8 are caused to move relative to each other so that they are in a state of friction at the blade tip 8a. As a result of this relative movement, the nanotubes 4 on the knife edge 6 are collected in the vicinity of the blade tip 6a and blade tip 8a.

Figure 6:
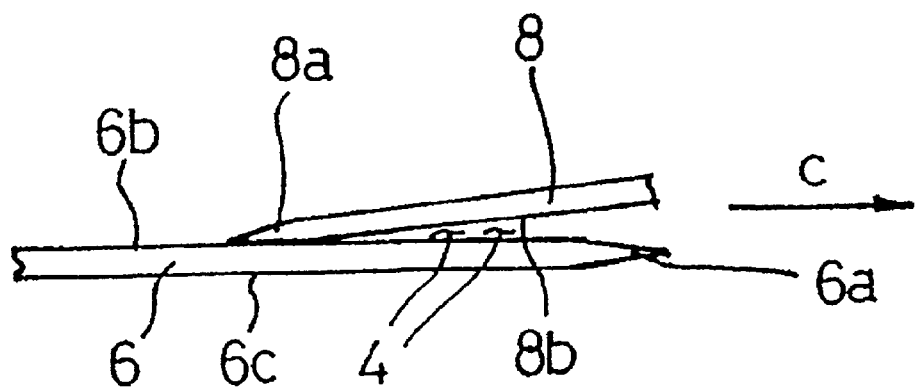
FIG. 6 is an enlarged view of the knife edge placed on the holder in an inclined state.

FIG. 6 is an enlarged view of the knife edges which are disposed in an obliquely intersecting relation. The blade tip 8a has a curvature when viewed on the microscopic scale. Accordingly, when this blade tip 8a is brought to contact with the upper surface 6b of the knife edge 6, as seen from FIG. 6, the undersurface 8b of the knife edge 8 is disposed at an inclination so that the undersurface 8b has a specified angle of inclination with respect to the upper surface 6b of the knife edge 6. When the knife edge 8 is moved in the direction shown by arrow c, the nanotubes 4 on the upper surface 6b of the knife edge 6 are scraped and collected toward the right by the blade tip 8a. As a result, the nanotubes 4 aggregate in the vicinity of the blade tip 6a of the knife edge 6 and of the blade tip 8a of the knife edge 8.

Figure 7:
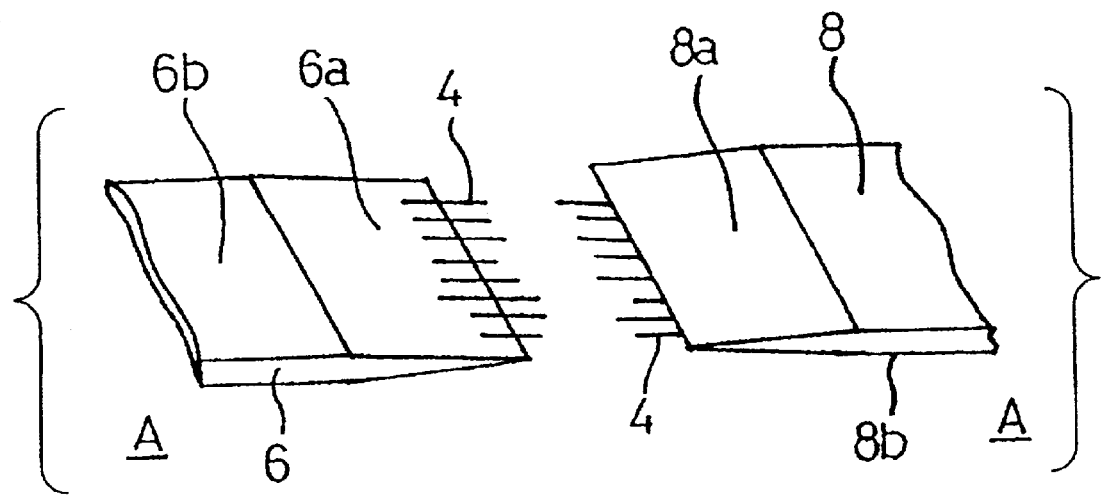
FIG. 7 is a perspective view of the essential portions of the completed nanotube cartridges.

FIG. 7 shows the essential portions of completed nanotube cartridges. The nanotubes 4 are on the upper-surface side of the blade tip 6a, and also they are on the undersurface side of the blade tip 8a. On the upper surface 6b of the knife edge 6, the nanotubes 4 are initially oriented in all directions. However, as a result of the movement of the knife edge 8 in the arrow c direction in FIG. 6, the orientations of the nanotubes 4 are automatically aligned in the direction of arrow c. The arrow c direction is perpendicular to the blade tip 6a and to the blade tip 8a. Accordingly, the nanotubes 4 are disposed so as to protrude perpendicularly from the blade tip 6a and from the blade tip 8a.

As a result, nanotube cartridges A are obtained on which the nanotubes 4 thus protrude perpendicularly from the blade tip 6a and from the blade tip 8a, respectively. As a result of the above steps, two nanotube cartridges A are simultaneously obtained.

In the above, the nanotubes 4 adhere also to the undersurface 6c of the knife edge 6. Thus, two nanotube cartridges are further manufactured by scraping the nanotubes 4 on the undersurface 6c by means of the same operation as described above. When the number of nanotubes on the cartridge A is small, then the number of nanotubes is increased by way of scraping once again the nanotubes on the knife edge 6.

Figure 8:
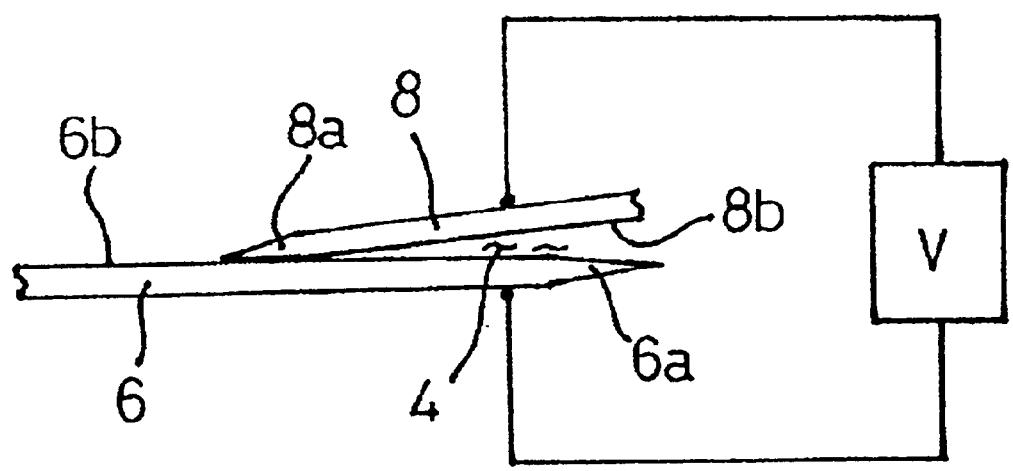
FIG. 8 is a diagram showing the application of a voltage across the knife edge and the holder.

FIG. 8 shows knife edges in an obliquely contacted state, and a voltage is applied across the knife edges. Both terminals of a voltage control circuit V are connected to the knife edges 6 and 8. Since the knife edges 6 and 8 are made of a conductive metal, a current-limiting circuit is set in the circuit so as to prevent an excessive current flow. When a direct-current voltage is applied, an electric field is formed between the knife edges 6 and 8, and the adhesion of the nanotubes 4 to the blade tips 6a and 8a is facilitated by the force of this electric field.

Figure 9:
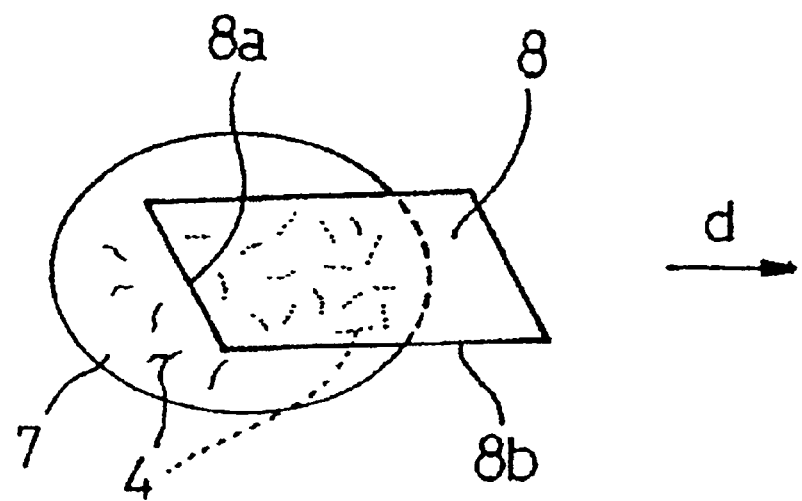
FIG. 9 is an explanatory diagram of the method used to collect nanotubes, which are adhered to a semiconductor wafer, on the blade tip of a knife edge.

FIG. 9 shows a method for collecting nanotubes, which are adhering to the surface of the semiconductor wafer 7, on the blade tip of a knife edge 8. The nanotubes 4 on the surface of the semiconductor wafer 7 are facing in all directions, and an unused knife edge 8 that has no adhered nanotubes thereon is set above the semiconductor wafer 7 so that the blade tip 8a faces toward the left in FIG. 9.

The blade tip 8a of the unused knife edge 8 is brought to contact with the surface of the semiconductor wafer 7. With this blade tip 8a being in contact with the semiconductor wafer 7, the knife edge 8 is disposed so that the opposite end from the blade tip 8a is caused to float. In other words, the right side of the knife edge 8 in FIG. 9 is raised. As a result, the knife edge 8 is set to obliquely intersect the semiconductor wafer 7 at a small angle of inclination. This state is substantially the same as that of FIGS. 5 and 6. Then, the knife edge 8 is moved in the direction indicated by arrow d in this state of blade tip contact. The nanotubes 4 are as a result collected on the undersurface of the blade tip 8a while the axial directions of the nanotubes 4 are aligned in the direction of arrow d, and a nanotube cartridge A is completed.

Figure 10:
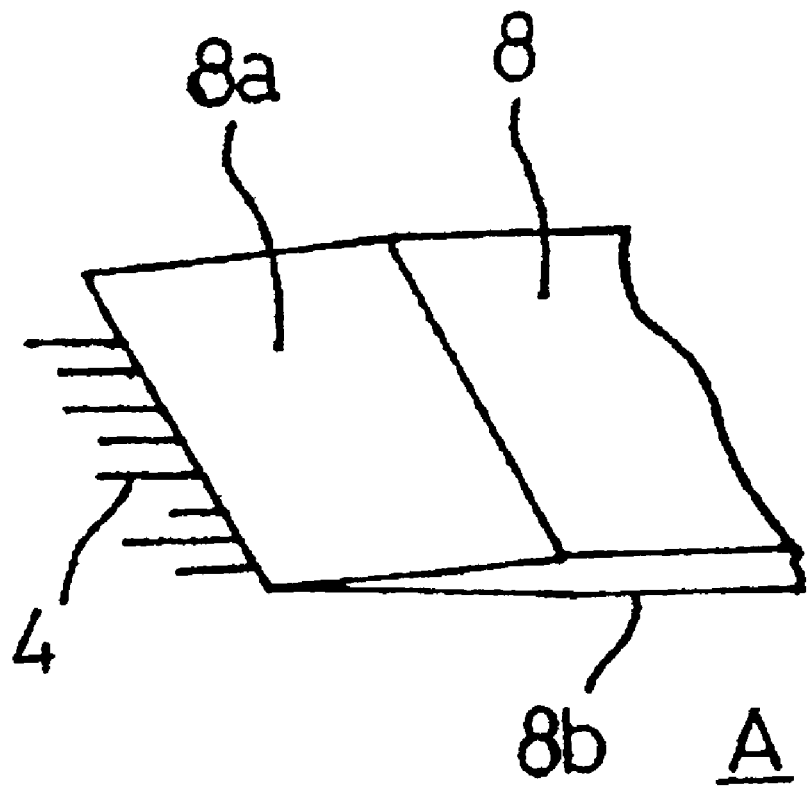
FIG. 10 is a perspective view of the essential portion of a completed nanotube cartridge.
Figure 11:
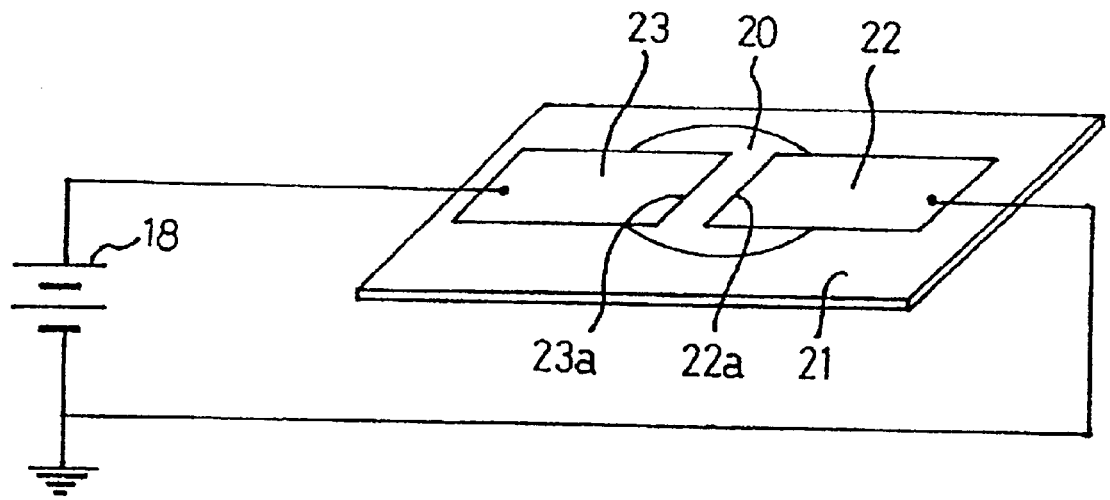
FIG. 11 is a diagram of the nanotube cartridge manufacturing process of the prior art that uses direct-current electrophoresis.
Figure 12:
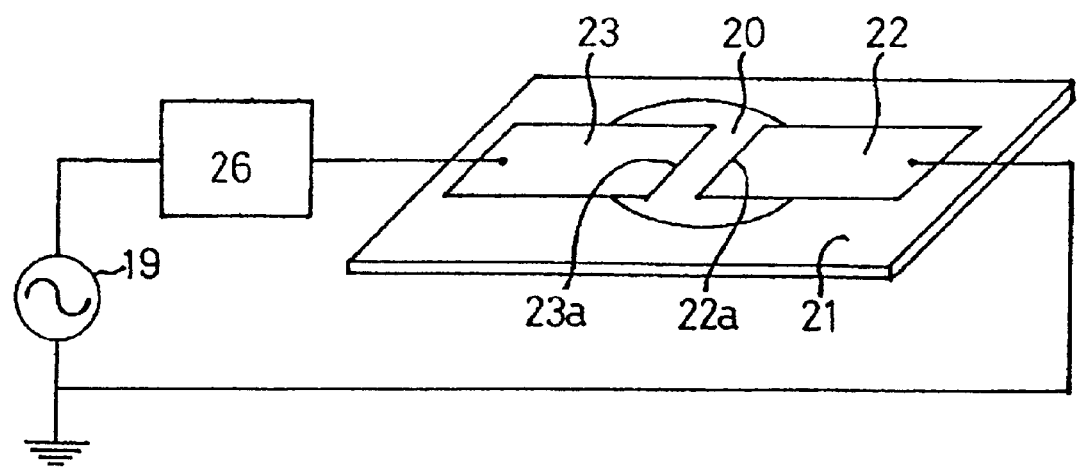
FIG. 12 is a diagram of the nanotube cartridge manufacturing process of the prior art that uses alternating-current electrophoresis.
Figure 13:
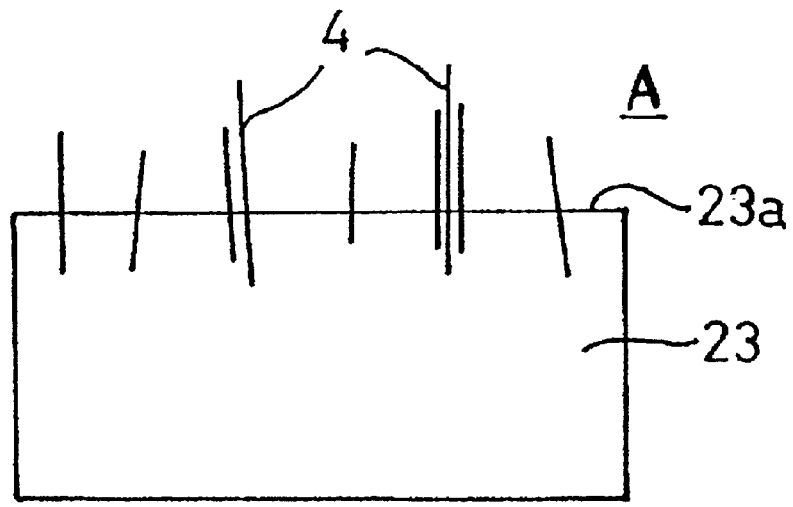
FIG. 13 is a schematic diagram of a completed prior art nanotube cartridge.
Figure 15:
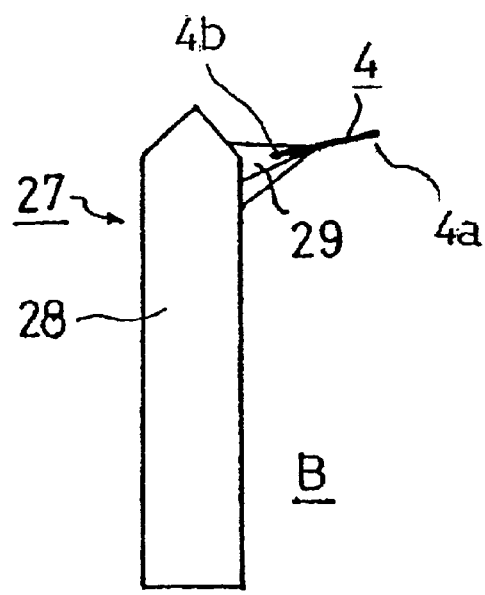
FIG. 15 is a model diagram of a completed nanotube probe needle.
Figure 14:
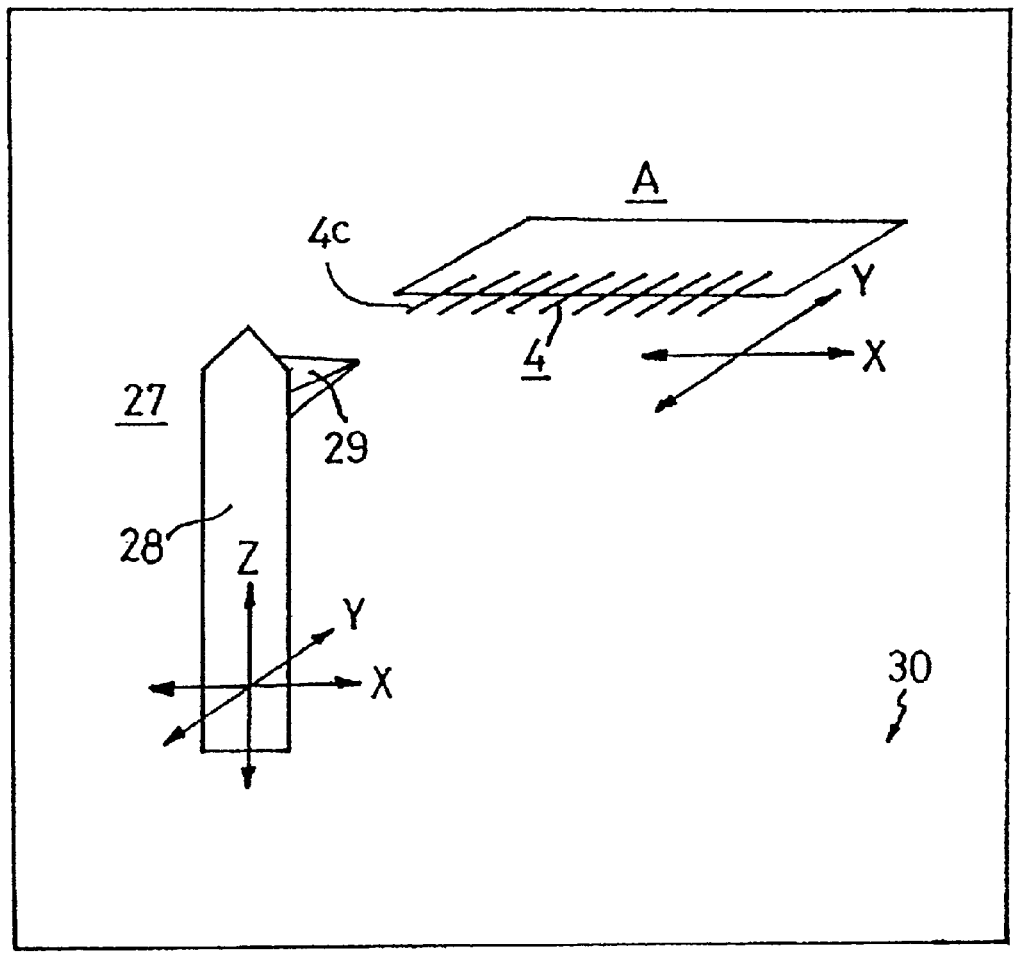
FIG. 14 is a diagram showing a transfer of a nanotube to an AFM cantilever.

FIG. 10 shows the essential portion of the completed nanotube cartridge A. It is seen that the nanotubes 4 protrude at right angles to the leading edge of the blade tip 8a. In the method shown in FIGS. 9 and 10, a single nanotube cartridge A is obtained by one operation. In this method, the nanotubes are arranged or lined up on only one surface of the knife edge 8.

Nanotubes 4 can be caused to adhere to the surface of a holder by sprinkling the nanotubes 4 on the surface of the holder (knife edges, semiconductor wafers, etc.) or by inserting the holder into a deposit of nanotubes and moving the holder back and forth. Furthermore, a voltage may be applied between the holder and nanotubes so that the nanotubes are adsorbed on the surface of the holder by an electrostatic force.

Members that are used as holders are not limited to knife edges, semiconductor wafers and semiconductor chips cut from semiconductor wafers. Any thin material that has a clean surface to which nanotubes can be caused to adhere can be used as a holder.

The present invention is not limited to the above-described embodiments. It goes without saying that various modifications and design alterations, etc. within limits that involve no departure from the technical concept of the present invention are within the technical scope of the present invention.

As seen from the above, in the present invention, nanotubes are aligned perpendicularly on the blade tip of a knife edge merely by moving the knife edge while the blade tip of the knife edge is in contact with the surface of a holder. Accordingly, nanotube cartridges can be manufactured in a single pass by an extremely simple operation.

Also, knife edges that have blade tips can be used as a holder. In this ways, two nanotube cartridges are simultaneously obtained in a single operation. Thus, the present invention provides a mass production method for nanotube cartridges.

In addition, since the semiconductor wafer or semiconductor chip can be used as a holder, in cases where knife edges are not available, such members can be used as a substitute.

Further, in addition to a holder with nanotubes adhering thereon, by way of using another knife tube that also has numerous nanotubes on its surface(s), a nanotube cartridge having nanotubes lined up or arranged on the blade tip at a high density is obtainable.

Furthermore, by way of applying a voltage across the holder and the knife edge, nanotubes are caused to adhere to the blade tip of the knife edge in an efficient fashion. Thus, an efficient manufacturing method for nanotube cartridges can be provided.

In addition, nanotubes are caused to adhere to the surface of a holder merely by, for instance, placing the holder in a vessel that accommodates nanotubes and vibrating the vessel.

Furthermore, a nanotube cartridge in which nanotubes are lined up perpendicularly on its blade tip can be manufactured merely by moving the knife edge while causing the blade tip to contact the holder surface having numerous nanotubes thereon. Accordingly, nanotube cartridges are obtained inexpensively and in large quantities.

What is claimed is:

1. A method for manufacturing a nanotube cartridge comprising the steps of:

adhering nanotubes to a surface of a holder, disposing a knife edge at an inclination to said surface of said holder so that a main body of said knife edge is caused to float with a blade tip of said knife edge being in contact with said surface of said holder, and collecting said nanotubes, which are on said surface of said knife edge, on a blade tip side of said knife edge by way of moving said knife edge in a direction opposite from said blade tip with said blade tip being kept in contact with said surface of said holder, thus allowing said nanotubes to be arranged on said blade tip of said knife edge with said nanotubes protruding from said blade tip.

2. The nanotube cartridge manufacturing method according to claim 1, wherein said holder is another knife edge that has a blade tip, a surface of said another knife edge being adhered with nanotubes.

3. The nanotube cartridge manufacturing method according to claim 1, wherein said holder is a semiconductor wafer or a semiconductor chip cut from said semiconductor wafer, a surface of said semiconductor wafer or said semiconductor chip being adhered with nanotubes.

4. The nanotube cartridge manufacturing method according to claim 1, wherein nanotubes are caused to adhere to said surface of said knife edge, and said knife edge having said nanotubes thereon is disposed at an inclination so that said surface of said knife edge having said nanotubes thereon faces said surface of said holder.

5. The nanotube cartridge manufacturing method according to claim 1, further comprising the step of applying a voltage across said holder and said knife edge.

6. The nanotube cartridge manufacturing method according to claim 1, wherein said nanotubes are accommodated in a vessel, then said holder is placed in said vessel, and said vessel as a whole is caused to vibrate so that said nanotubes are caused to adhere to said surface of said holder.

* * * * *

UNITED STATES PATENT AND TRADEMARK OFFICE
CERTIFICATE OF CORRECTION

PATENT NO. : 6,892,432 B2
DATED : May 17, 2005
INVENTOR(S) : Yoshikzu Nakayama et al.

Page 1 of 1

It is certified that error appears in the above-identified patent and that said Letters Patent is hereby corrected as shown below:

<u>Title page,</u>
Item [75], Inventors, change "Yoshikazu Nakayama, 9-404, 14-2, Kongaoka 1-chome, Hirakata-city, Osaka 573-0084 (JP); Seiji Akita, Izumi (JP); Takayoshi Kishida, Miyazaki (JP); Akio Harada, Osaka (JP)" to -- Yoshikazu Nakayama, 9-404, 14-2, Korigaoka 1-chome, Hirakata-city, Osaka 573-0084 (JP); Seiji Akita, Izumi (JP); Takayoshi Kishida, Miyazaki (JP); Akio Harada, Osaka (JP) --.

Signed and Sealed this

Thirteenth Day of June, 2006

JON W. DUDAS
*Director of the United States Patent and Trademark Office*